(12) United States Patent
Rui

(10) Patent No.: US 6,859,802 B1
(45) Date of Patent: Feb. 22, 2005

(54) IMAGE RETRIEVAL BASED ON RELEVANCE FEEDBACK

(75) Inventor: Yong Rui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 09/660,536

(22) Filed: Sep. 13, 2000

Related U.S. Application Data

(60) Provisional application No. 60/153,730, filed on Sep. 13, 1999.

(51) Int. Cl.[7] .............................................. G06F 17/30
(52) U.S. Cl. ................. 707/5; 707/4; 707/6; 707/104.1
(58) Field of Search ............................... 382/155–161, 382/190–191, 195; 707/104.1, 6, 2, 3, 4, 5

(56) References Cited

U.S. PATENT DOCUMENTS

| | | | | |
|---|---|---|---|---|
| 5,696,964 A | * | 12/1997 | Cox et al. ................. | 707/104.1 |
| 5,778,362 A | * | 7/1998 | Deerwester ................... | 704/7 |
| 5,855,015 A | * | 12/1998 | Shoham ........................ | 707/4 |
| 5,893,095 A | * | 4/1999 | Jain et al. ................... | 382/141 |
| 5,933,823 A | * | 8/1999 | Cullen et al. ............... | 707/530 |
| 5,950,189 A | * | 9/1999 | Cohen et al. ................. | 707/3 |
| 6,173,275 B1 | * | 1/2001 | Caid et al. .................. | 382/190 |
| 6,345,274 B1 | * | 2/2002 | Zhu et al. .................... | 707/5 |
| 6,347,313 B1 | * | 2/2002 | Ma et al. ...................... | 707/3 |
| 6,408,293 B1 | * | 6/2002 | Aggarwal et al. ............ | 707/102 |
| 6,411,953 B1 | * | 6/2002 | Ganapathy et al. ......... | 707/104.1 |
| 6,504,571 B1 | * | 1/2003 | Narayanaswami et al. ....... | 348/231.99 |

OTHER PUBLICATIONS

Benitez et al. "Using Relevance Feedback in Content–Based Image Metasearch" IEEE Internet Computing. vol. 2, Issue 4. Jul–Aug 1998. pp. 59–69.*

Rui et al. "Relevance Feedback: A Power Tool for Interactive Content–Based Image Retrieval", IEEE Transactions on Circuits and Systems for Video Technology. vol. 8, Issue 5, pp. 644–655. Sep. 1998.*

Rui et al. "A Relevance Feedback Architecture for Content–based Multimedia Information Retrieval Systems", Proceedings of the IEEE Workshop on Content–Based Access of Image and Video Libraries, 1997. pp. 82–89. Jun. 1997.*

Rui et al. "Content–Based Image Retrieval with Relevance Feedback in MARS", IEEE: Proceedings of the International Conference on Image Processing, 1997. pp. 815–818 vol. 2. Oct. 1997.*

(List continued on next page.)

*Primary Examiner*—Safet Metjahic
*Assistant Examiner*—Brian Goddard
(74) *Attorney, Agent, or Firm*—Lee & Hayes, PLLC

(57) ABSTRACT

An improved image retrieval process based on relevance feedback uses a hierarchical (per-feature) approach in comparing images. Multiple query vectors are generated for an initial image by extracting multiple low-level features from the initial image. When determining how closely a particular image in an image collection matches the initial image, a distance is calculated between the query vectors and corresponding low-level feature vectors extracted from the particular image. Once these individual distances are calculated, they are combined to generate an overall distance that represents how closely the two images match. According to other aspects, relevancy feedback received regarding previously retrieved images is used during the query vector generation and the distance determination to influence which images are subsequently retrieved.

25 Claims, 5 Drawing Sheets

OTHER PUBLICATIONS

Ortega et al. "Supporting Similarity Queries in MARS", Proceedings of the fifth ACM international conference on Multimedia. pp. 403–413, ACM Press. Nov. 1997.*

Nastar et al. "Surfimage: a Flexible Content–Based Image Retrieval System", Proceedings of the sixth ACM international conference on Multimedia. pp. 339–344, ACM Press. Sep. 1998.*

Wood et al. "Iterative Refinement by Relevance Feedback in Content–Based Digital Image Retrieval", Proceedings of the sixth ACM international conference on Multimedia. pp. 13–20, ACM Press. Sep. 1998.*

Rui, Y. et al., "Digital Image/Video Library and MPEG–7: Standardization and Research Issues", Proceedings of IEEE ICASSP, Seattle, Washington, pp 3785–3788.

Rui, Y. et al, "Constructing Table–of–Contents for Videos", ACM Multimedia Systems Journal, Special Issue Multimedia Systems on Video Libraries, vol. 7, No. 5, Sep. 1999, pp. 359–368.

Ishikawa, Y. et al., "Mindreader: Query databases through mulitple examples," Proc. of the 24th VLDB Conference, (New York), 1998, pp. 218–227.

Rui, Y. et al., "Image retrieval: Current techniques promising directions, and open issues," Journal of Visual Communication and Image Representation, vol. 10, 39–62, Mar. 1999, 17 pages.

Picard, R. W., "Digital libraries: Meeting place for high–level and low–level vision," Proc. Asian Conf. on Comp. Vis., Dec. 1995, pp. 1–5.

Cox, I.J., "Target Testing and the PicHunter Bayesian Multimedia Retrieval System," Proc. of the 3rd Forum on Research and Technology Advances in Digital Libraries (ADL '96), 66–75, (1996), pp. 1–10.

Zhou, Xiang Sean, "Water–Filling: A Novel Way for Image Structural Feature Extraction," 5 pages.

Rui, Yong et al., "Relevance Feedback Techniques in Interactive Content–Based Image Retrieval", Proc. of IS&T and SPIE Storage and Retrieval of Image and Video Databases VI, pp 25–36, Jan. 24–30, 1998, San Jose, California.

Rui, Yong, Effiicient Indexing, Browsing and Retrieval of Image/Video Content, PhD Thesis, University of Illinois at Urbaba–Champaign, 1998.

* cited by examiner

IMAGE RETRIEVAL BASED ON RELEVANCE FEEDBACK

RELATED APPLICATIONS

This application claims the benefit of U.S. Provisional Application No. 60/153,730, filed Sep. 13, 1999, entitled "MPEG-7 Enhanced Multimedia Access" to Yong Rui, Jonathan Grudin, Anoop Gupta, and Liwei He, which is hereby incorporated by reference.

TECHNICAL FIELD

This invention relates to image storage and retrieval, and more particularly to retrieving images based on relevance feedback.

BACKGROUND OF THE INVENTION

Computer technology has advanced greatly in recent years, allowing the uses for computers to similarly grow. One such use is the storage of images. Databases of images that are accessible to computers are constantly expanding and cover a wide range of areas, including stock images that are made commercially available, images of art collections (e.g., by museums), etc. However, as the number of such images being stored has increased, so too has the difficulty in managing the retrieval of such images. Often times it is difficult for a user to search databases of such images to identify selected ones of the thousands of images that are available.

One difficulty in searching image databases is the manner in which images are stored versus the manner in which people think about and view images. It is possible to extract various low-level features regarding images, such as the color of particular portions of an image and shapes identified within an image, and make those features available to an image search engine. However, people don't tend to think of images using such low-level features. For example, a user that desires to retrieve images of brown dogs would typically not be willing and/or able to input search parameters identifying the necessary color codes and particular areas including those color codes, plus whatever low-level shape features are necessary to describe the shape of a dog in order to retrieve those images. Thus, there is currently a significant gap between the capabilities provided by image search engines and the usability desired by people using such engines.

One solution is to provide a text-based description of images. In accordance with this solution, images are individually and manually categorized by people, and various descriptive words for each image are added to a database. For example, a picture of a brown dog licking a small boy's face may include key words such as dog, brown, child, laugh, humor, etc. There are, however, problems with this solution. One such problem is that it requires manual categorization—an individual(s) must take the time to look at a picture, decide which key words to include for the picture, and record those key words. Another problem is that such a process is subjective. People tend to view images in different ways, viewing shapes, colors, and other features differently. With such a manual process, the key words will be skewed towards the way the individual cataloging the images views the images, and thus different from the way many other people will view the images.

The invention described below addresses these disadvantages, providing for improved image retrieval based on relevance feedback.

SUMMARY OF THE INVENTION

Improved image retrieval based on relevance feedback is described herein.

According to one aspect, a hierarchical (per-feature) approach is used in comparing images. Multiple query vectors are generated for an initial image by extracting multiple low-level features from the initial image. When determining how closely a particular image in an image collection matches that initial image, a distance is calculated between the query vectors and corresponding low-level feature vectors extracted from the particular image. Once these individual distances are calculated, they are combined to generate an overall distance that represents how closely the two images match.

According to another aspect, when a set of potentially relevant images are presented to a user, the user is given the opportunity to provide feedback regarding the relevancy of the individual images in the set. This relevancy feedback is then used to generate a new set of potentially relevant images for presentation to the user. The relevancy feedback is used to influence the generation of the query vector, influence the weights assigned to individual distances between query vectors and feature vectors when generating an overall distance, and to influence the determination of the distances between the query vectors and the feature vectors.

According to another aspect, the calculation of a distance between a query vector and a feature vector involves the use of a matrix to weight the individual vector elements. The type of matrix used varies dynamically based on the number of images for which feedback has been received from the user and the number of feature elements in the feature vector. If the number of images for which feedback has been received is less than the number of feature elements, then a diagonal matrix is used (which assigns weights to the individual vector elements in the distance calculation). However, if the number of images for which feedback has been received equals or exceeds the number of feature elements, then a full matrix is used (which transforms the low-level features of the query vector and the feature vector to a higher level feature space, as well as assigns weights to the individual transformed elements in the distance calculation).

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
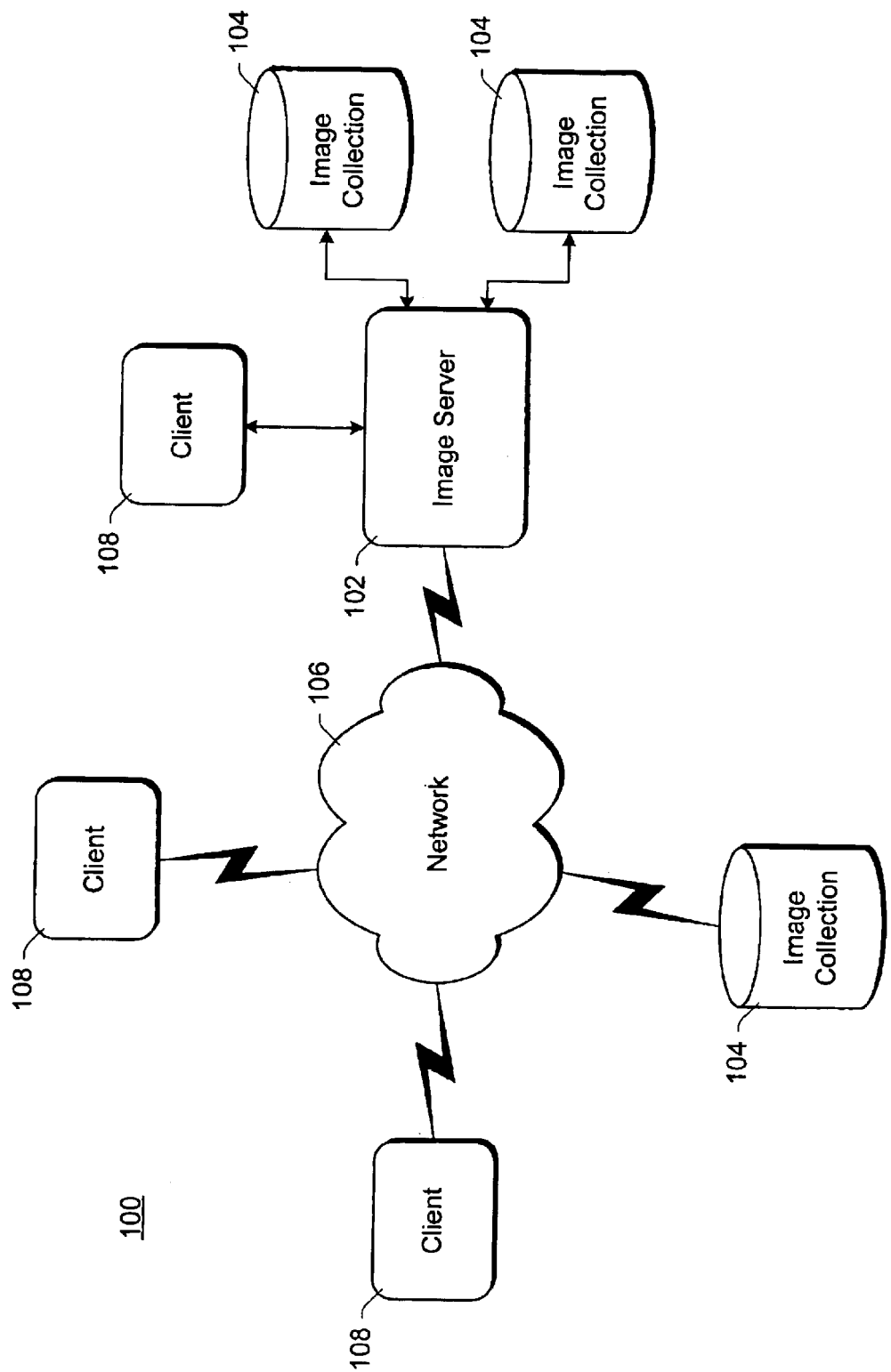
FIG. 1 is a block diagram illustrating an exemplary network environment such as may be used in accordance with certain embodiments of the invention.

FIG. 1 is a block diagram illustrating an exemplary network environment such as may be used in accordance with certain embodiments of the invention. In the network environment 100 of FIG. 1, an image server 102 is coupled to one or more image collections 104. Each image collection stores one or more images of a wide variety of types. In one implementation, the images are still images, although it is to be appreciated that other types of images can also be used with the invention. For example, each frame of moving video can be treated as a single still image. Image collections 104 may be coupled directly to image server 102, incorporated into image server 102, or alternatively indirectly coupled to image server 102 such as via a network 106.

Also coupled to image server 102 is one or more client devices 108. Client devices 108 may be coupled to image server 102 directly or alternatively indirectly (such as via network 106). Image server 102 acts as an interface between clients 108 and image collections 104. Image server 102 allows clients 108 to retrieve images from image collections 104 and render those images. Users of clients 108 can then input relevance feedback, which is returned to image server 102 and used to refine the image retrieval process, as discussed in more detail below.

Network 106 represents any of a wide variety of wired and/or wireless networks, including public and/or private networks (such as the Internet, local area networks (LANs), wide area networks (WANs), etc.). A client 108, image server 102, or image collection 104 can be coupled to network 106 in any of a wide variety of conventional manners, such as wired or wireless modems, direct network connections, etc.

Communication among devices coupled to network 106 can be accomplished using one or more protocols. In one implementation, network 106 includes the Internet. Information is communicated among devices coupled to the Internet using, for example, the well-known Hypertext Transfer Protocol (HTTP), although other protocols (either public and/or proprietary) could alternatively be used.

Figure 2:
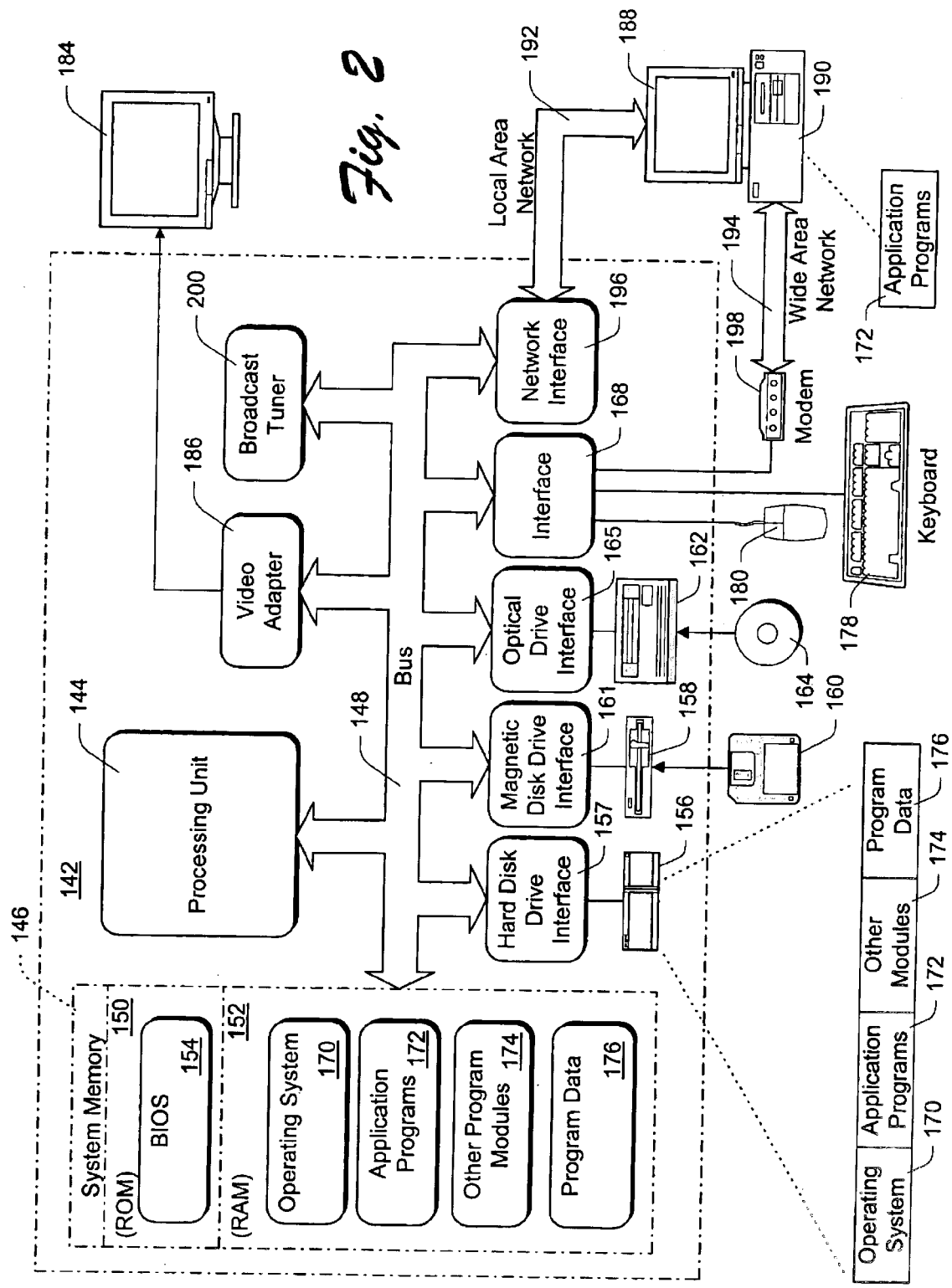
FIG. 2 illustrates an example of a suitable operating environment in which the invention may be implemented.

FIG. 2 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

FIG. 2 shows a general example of a computer 142 that can be used in accordance with the invention. Computer 142 is shown as an example of a computer that can perform the functions of client 108 or server 102 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory 146 includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk drive interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from and/or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it will be appreciated by those skilled in the art that other types of computer readable media which can store data that is accessible by a computer, such as magnetic cassettes, flash memory cards, random access memories (RAMs), read only memories; (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus (e.g., a serial port interface, a parallel port interface, a universal serial bus (USB) interface, etc.). A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In certain embodiments of the invention, computer 142 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 also includes a broadcast tuner 200. Broadcast tuner 200 receives broadcast signals either directly (e.g., analog or digital cable transmissions fed directly into tuner 200) or via a reception device (e.g., via an antenna or satellite dish).

Computer 142 typically includes at least some form of computer readable media. Computer readable media can be any available media that can be accessed by computer 142. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 142. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the programs modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

Figure 3:
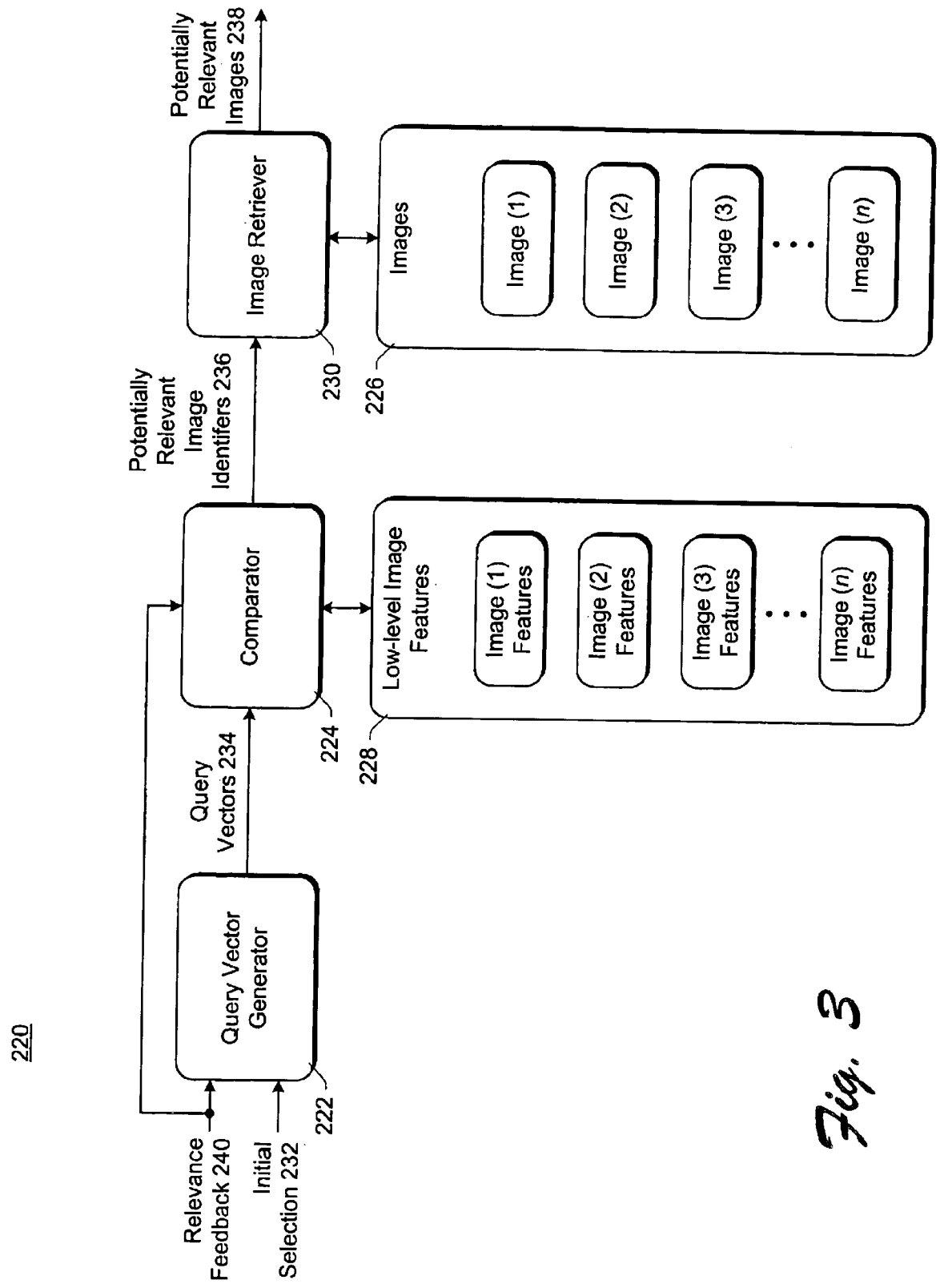
FIG. 3 is a block diagram illustrating an exemplary image retrieval architecture in accordance with certain embodiments of the invention.

FIG. 3 is a block diagram illustrating an exemplary image retrieval architecture in accordance with certain embodiments of the invention. The image retrieval architecture 220 illustrated in FIG. 3 is implemented, for example, in an image server 102 of FIG. 1. Architecture 220 includes a query vector generator 222, a comparator 224, multiple images 226 and corresponding low-level image features 228, and an image retriever 230.

Multiple low-level features are extracted for each image 226. These features are described as being extracted prior to the image retrieval process discussed herein, although the features could alternatively be extracted during the image retrieval process. Each feature is a vector (referred to as a feature vector) that includes multiple feature elements. The number of feature elements in a feature vector can vary on a per-feature basis.

Low-level image features 228 can include any of a wide variety of conventional features, such as: color moment features, color histogram features, wavelet texture features, Fourier descriptor features, water-fill edge features, etc. In one implementation, low-level features 228 include three features: a color moments feature, a wavelet based texture feature, and a water-fill edge feature. The color moments feature is a 6-element vector obtained by extracting the mean and standard deviation from three color channels in the HSV (hue, saturation, value) color space. The wavelet based texture feature is a 10-element vector obtained by a wavelet filter bank decomposing the image into 10 de-correlated sub-bands, with each sub-band capturing the characteristics of a certain scale and orientation of the original image. The standard deviation of the wavelet coefficients for each sub-band is extracted, and these standard deviations used as the elements of the feature vector. The water-fill edge feature is an 18-element vector that is obtained by extracting 18 different elements from the edge maps: the maximum filling time and associated fork count, the maximum fork count and associated filing time, the filling time histogram for each of seven bins (ranges of values), and the fork count histogram for each of seven bins. Additional information regarding the water-fill edge feature can be found in Xiang Sean Zhou, Yong Rui, and Thomas S. Huang, "Water-Filling: A Novel Way for Image Structural Feature Extraction", Proc. of IEEE International Conference on Japan, October 1999, which is hereby incorporated by reference.

Low-level image features 228 can be stored and made accessible in any of a wide variety of formats. In one implementation, the low-level features 228 are generated and stored in accordance with the MPEG-7 (Moving Pictures Expert Group) format. The MPEG-7 format standardizes a set of Descriptors (Ds) that can be used to describe various types of multimedia content, as well as a set of Description Schemes (DSs) to specify the structure of the Ds and their relationship. In MPEG-7, the individual features 228 are each described as one or more Descriptors, and the combination of features is described as a Description Scheme.

During the image retrieval process, search criteria in the form a of an initial image selection 232 is input to query vector generator 222. The initial image selection 232 can be in any of a wide variety of forms. For example, the initial image may be an image chosen from images 226 in accordance with some other retrieval process (e.g., based on a descriptive keyword search), the image may be an image that belongs to the user and is not included in images 226, etc. The initial selection 232 may or may not include low-level features for the image. If low-level features that will be used by comparator 224 are not included, then those low-level features are generated by query vector generator 222 based on initial selection 232 in a conventional manner. Note that these may be the same features as low-level image features 228, or alternatively a subset of the features 228. However, if the low-level features are already included, then query vector generator 222 need not generate them. Regardless of whether generator 222 generates the low-level features for initial image selection 232, these low-level features are output by query vector generator 222 as query vectors 234.

Comparator 224 performs an image comparison based on the low-level image features 228 and the query vectors 234. This comparison includes possibly mapping both the low-level image features 228 and the query vectors 234 to a higher level feature space and determining how closely the transformed (mapped) features and query vectors match. An identification 236 of a set of potentially relevant images is then output by comparator 224 to image retriever 230. The potentially relevant images are those images that comparator 224 determines have low-level image features 228 most closely matching the query vectors. Retriever 230 obtains the identified images from images 226 and returns those images to the requestor (e.g., a client 108 of FIG. 1) as potentially relevant images 238.

A user is then able to provide relevance feedback 240 to query vector generator 222. In one implementation, each of the potentially relevant images 238 is displayed to the user at a client device along with a corresponding graphical "degree of relevance" slider. The user is able to slide the slider along a slide bar ranging from, for example, "Not Relevant" to "Highly Relevant". Each location along the slide bar that the slider can be positioned at by the user has a corresponding value that is returned to the generator 222 and comparator 224 and incorporated into their processes as discussed in more detail below. In one implementation, if the user provides no feedback, then a default relevancy feedback is assigned to the image (e.g., equivalent to "no opinion"). Alternatively, other user interface mechanisms may be used to receive user feedback, such as radio buttons corresponding to multiple different relevancy feedbacks (e.g., Highly Relevant, Relevant, No Opinion, Irrelevant, and Highly Irrelevant), verbal feedback (e.g., via speech recognition), etc.

The relevance feedback is used by query vector generator 222 to generate a new query vector and comparator 224 to identify a new set of potentially relevant images. The user relevance feedback 240 can be numeric values that are directly used by generator 222 and comparator 224, such as: an integer or real value from zero to ten; an integer or real value from negative five to positive five; values corresponding to highly relevant, somewhat relevant, no opinion, somewhat irrelevant, and highly irrelevant of 7, 3, 0, −3, and −7, respectively. Alternatively, the user relevance feedback 240 can be an indication in some other format (e.g., the text or encoding of "Highly Relevant") and converted to a useable numeric value by generator 222, comparator 224, and/or another component (not illustrated).

The second set of potentially relevant images displayed to the user is determined by comparator 224 incorporating the relevance feedback 240 received from the user into the comparison process. This process can be repeated any number of times, with the feedback provided each time being used to further refine the image retrieval process.

Note that the components illustrated in architecture 220 may be distributed across multiple devices. For example, low-level features 228 may be stored locally at image server 102 of FIG. 1 (e.g., on a local hard drive) while images 226 may be stored at one or more remote locations (e.g., accessed via network 106).

The image retrieval process discussed herein refers to several different types of matrixes, including diagonal matrixes, full matrixes, and the identity matrix. A diagonal matrix refers to a matrix that can have any value along the diagonal, where the diagonal of a matrix B are the elements of the matrix at positions $B_{jj}$, and values not along the diagonal are zero. The identity matrix is a special case of the diagonal matrix where the elements of the matrix along the diagonal all have the value of one and all other elements in the matrix have a value of zero. A full matrix is a matrix in which any element can have any value. These different types of matrixes are well-known to those skilled in the art, and thus will not be discussed further except as they pertain to the present invention.

The specific manner in which query vectors are generated, comparisons are made, and relevance feedback is incorporated into both of these processes will now be described. It is to be appreciated that these specific manners described are only examples of the processes and that various modifications can be made to the these descriptions.

Each single image of the images 226 has multiple (I) corresponding low-level features in the features 228. As used herein, $\vec{x}_{mi}$ refers to the $i^{th}$ feature vector of the $m^{th}$ image, so:

$$\vec{x_{mi}} = [x_{mi1}, \ldots, x_{mik}, \ldots, x_{miK_i}]$$

where $K_i$ is the length of the feature vector $\vec{x}_{mi}$.

A query vector is generated as necessary for each of the low-level feature spaces. The query vector is initially generated by extracting the low-level feature elements in each of the feature spaces from the initial selection 232. The query vector can be subsequently modified by the relevance feedback 240, as discussed in more detail below. The query vector in a feature space i is:

$$\vec{q_i} = [q_{i1}, \ldots, q_{ik}, \ldots, q_{iK_i}]$$

To, compare the query vector ($\vec{q}_i$) and a corresponding feature vector of an image m ($\vec{x}_{mi}$), the distance between the two vectors is determined. A wide variety of different distance metrics can be used, and in one implementation the generalized Euclidean distance is used. The generalized Euclidean distance between the two vectors, referred to as gas is calculated as follows:

$$g_{mi} = (\vec{q}_i - \vec{x}_{mi})^T W_i (\vec{q}_i - \vec{x}_{mi})$$

where $W_i$ is a matrix that both optionally transforms the low-level feature space into a higher level feature space and then assigns weights to each feature element in the higher level feature space. When sufficient data is available to perform the transformation, the low-level feature space is transformed into a higher level feature space that better models user desired high-level concepts.

The matrix $W_i$ can be decomposed as follows:

$$W_i = P_i^T \Lambda_i P_i$$

where $P_i$ is an orthonormal matrix consisting of the eigen vectors of $W_i$, and $\Lambda_i$ is a diagonal matrix whose diagonal elements are the eigen values of $W_i$. Thus, the calculation to determine the distance $g_{mi}$ can be rewritten as:

$$g_{mi} = (P_i(\vec{q}_i - \vec{x}_{mi}))^T \Lambda_i (P_i(\vec{q}_i - \vec{x}_{mi}))$$

where the low-level feature space is transformed into the higher level feature space by the mapping matrix $P_i$ and then weights are assigned to the feature elements of the new feature space by the weighting matrix $\Lambda_i$.

However, in some situations there may be insufficient data to reliably perform the transformation into the higher level feature space. In such situations, the matrix $W_i$ is simply the weighting matrix $\Lambda_i$, so $g_{mi}$ can be rewritten as:

$$g_{mi} = (\vec{g}_i - \vec{x}_{mi})^T \Lambda_i (\vec{q}_i - \vec{x}_{mi})$$

Typically, each of multiple (I) low-level feature vectors of images in the database is compared to a corresponding query vector and the individual distances between these vectors determined. Once all of the I low-level feature vectors have been compared to the corresponding query vectors and distances determined, these distances are combined to generate an overall distance $d_m$, which is defined as follows:

$$d_m = U(g_{mi})$$

where U( ) is a function that combines the individual distances $g_{mi}$ to form the overall distance $d_m$. Thus, a hierarchical approach is taken to determining how closely two images match: first individual distances between the feature vectors and the query vectors are determined, and then these individual distances are combined.

The function U( ) can be any of a variety of different combinatorial functions. In one implementation, the function U( ) is a weighted summation of the individual distances, resulting in:

$$d_m = \sum_{i=1}^{I} u_i [(\vec{q_i} - \vec{x_{mi}})^T W_i (\vec{q_i} - \vec{x_{mi}})]$$

The feature vectors of the individual images ($\vec{x}_{mi}$) are known (they are features 228). The additional values needed to solve for the overall distance $d_m$ are: the weights ($u_i$) of each individual feature distance, the query vector ($\vec{q}_i$) for each feature, and the transformation matrix ($W_i$) for each feature. For the first comparison (before any relevance feedback 240 is received), each query vector ($\vec{q}_i$) is simply the corresponding extracted feature elements of the initial selection 232, the weights ($u_i$) of each individual distance are the same (e.g., a value of 1/I, where I is the number of features used), and each transformation matrix ($W_i$) is the identity matrix. The determination of these individual values based on relevance feedback is discussed in more detail below.

Alternatively, the generalized Euclidean distance could also be used to compute $d_m$, as follows:

$$d_m = \vec{g_{mi}}^T U \vec{g_{mi}}$$

where U is an (I×I) full matrix.

The overall distance $d_m$ is thus calculated for each image 226. Alternatively, the overall distance $d_m$ may be calculated for only a subset of images 226. Which subset of images 226 to use can be identified in any of a variety of manners, such as using well-known multi-dimensional indexing techniques (e.g., R-tree or R*-tree).

A number of images 226 having the smallest distance dm, are then selected as potentially relevant images to be presented to a user. The number of images 226 can vary, and in one implementation is determined empirically based on both the size of display devices typically being used to view the images and the size of the images themselves. In one implementation, twenty images are returned as potentially relevant.

User relevance feedback 240 identifies degrees of relevance for one or more of the potentially relevant images 238 (that is, a value indicating how relevant each of one or more of the images 238 is). A user may indicate that only selected ones of the images 238 are relevant, and user relevance feedback 240 identify degrees of relevance for only those selected images. Alternatively, user relevance feedback 240 may identify degrees of relevance for all images 238, such as by assigning a default value to those images for which the user did not assign a relevancy. These default values (and corresponding image features) can then be ignored by query vector generator 222 and comparator 224 (e.g., dropped from relevance feedback 240), or alternatively treated as user input feedback and used by vector generator 222 and comparator 224 when generating new values.

Once relevance feedback 240 is received, query vector generator 222 generates new query vectors 234. The new query vectors are referred to as $\vec{q}_i^*$, and are defined as follows:

$$\vec{q_i} *= \frac{\vec{\pi}^T X_i}{\sum_{n=1}^{N} \pi_n}$$

where N represents the number of potentially relevant images for which the user input relevance feedback (e.g., non-default relevance values were returned), which can be less than the number of potentially relevant images that were displayed to the user (N may also be referred to as the number of training samples); $\pi_n$ represents the degree of relevance of image n as indicated by the relevance feedback from the user (that is, a degree of relevance value associated with the relevance indicated by the user), $\vec{\pi}^T$ represents a (1×N) vector of the individual $\pi_n$ values, and $X_i$ represents a training sample matrix for feature I that is obtained by stacking the N training vectors ($\vec{x}_{ni}$) into a matrix, and resulting in an (N×$K_i$) matrix.

Alternatively, N (both here and elsewhere in this discussion) may represent the number of potentially relevant images for which relevance feedback was received regardless of the source (e.g., including both user-input feedback and default relevance values).

The process of presenting potentially relevant images to a user and receiving relevance feedback for at least portions of that set of potentially relevant images can be repeated multiple times. The results of each set of feedback can be to saved and used for determining subsequent query vectors (as well as the weights ($u_i$) of each individual distance and each transformation matrix ($W_i$)) in the process, or alternatively only a certain number of preceding sets of feedback may be used. For example, if three sets of twenty images each are presented to a user and relevance feedback returned for each image of the three sets, then to generate the fourth set the feedback from all sixty images may be used. Alternatively, only the feedback from the most recent set of twenty images may be used (or the two most recent sets, etc.).

Comparator 224 also receives relevance feedback 240 and uses relevance feedback 240 to generate a new value for $W_i$, which is referred to as $W_i^*$. The value of $W_i^*$ is either a full matrix or a diagonal matrix. When the number of potentially relevant images for which the user input relevance feedback (N) is less than the length of the feature vector ($K_i$), the value of $W_i^*$ as a full matrix cannot be calculated (and is difficult to reliably estimate, if possible at all). Thus, in situations where N<$K_i$, $W_i^*$ is a diagonal matrix; otherwise $W_i^*$ is a full matrix.

To generate the full matrix, $W_i^*$ is calculated as follows:

$$W_i^* = (\det(C_i))^{\frac{1}{K_i}} C_i^{-1}$$

where det($C_i$) is the matrix determinant of $C_i$, and $C_i$ is the ($K_i \times K_i$) weighted covariance matrix of $X_i$. In other words, $$C_{i_{rs}} = \frac{\sum_{n=1}^{N} \pi_n (x_{nir} - q_{ir})(x_{nis} - q_{is})}{\sum_{n=1}^{N} \pi_n}$$

where r is the row index of the matrix $C_i$ and ranges from 1 to $K_i$, s is the column index of the matrix $C_i$ and ranges from 1 to $K_i$, N represents the number of potentially relevant images for which the user input relevance feedback, $\pi_n$, represents the degree of relevance of image n, $x_{nir}$ refers to the $r^{th}$ element of the feature vector for feature i of image n, $q_{i_r}$ refers to the $r^{th}$ element of the query vector for feature i, $x_{n_{is}}$ refers to the se element of the feature vector for feature i of the $n^{th}$) image, and $q_{i_s}$ refers to the $s^{th}$ element of the query vector for feature i.

To generate the diagonal matrix, each diagonal element of the matrix is calculated as follows:

$$w_{i_{kk}} = \frac{1}{\sigma_{ik}}$$

where $w_{i_{kk}}$ is the $kk^{th}$ element of matrix $W_i$ and $\sigma_{ik}$ is the standard deviation of the sequence of $x_{ik}$'s, and where each $x_{ik}$ is the $k^{th}$ element of feature i.

It should be noted that the determination of whether $W_i$ is to be a full matrix or a diagonal matrix is done on a per-image basis as well as a per-feature basis for Leach image. Thus, depending on the length of each feature vector, $W_i$ may be different types of matrixes for different features.

It should also be noted that in situations where $W_i$ is a diagonal matrix, the distance ($g_{mi}$) between a query vector ($\vec{q}_i$) and a feature vector ($\vec{x}_{mi}$) is based on weighting the feature elements but not transforming the feature elements to a higher level feature space. This is because there is an insufficient number of training samples to reliably perform the transformation. However, in situations where $W_i$ is a full matrix, the distance ($g_{mi}$) between a query vector ($\vec{q}_i$) and a feature vector ($\vec{x}_{mi}$) is based on both transforming the low-level features to a higher level feature space and weighting the transformed feature elements.

Once relevance feedback 240 is received, comparator 224 also generates a new value for $u_i$, which is referred to as $u_{i^*}$, and is calculated as follows:

$$u_i^* = \sum_{j=1}^{I} \sqrt{\frac{f_j}{f_i}}$$

where $$f_i = \sum_{n=1}^{N} \pi_n g_{ni}$$

where N represents the number of potentially relevant images for which the user input relevance feedback, $\pi_n$ represents the degree of relevance of image n, and $g_{mi}$ ($g_{mi}$ as discussed above) represents the distance between the previous query vector ($\vec{q}_i$) and the feature vector ($\vec{x}_{mi}$).

Figure 4:
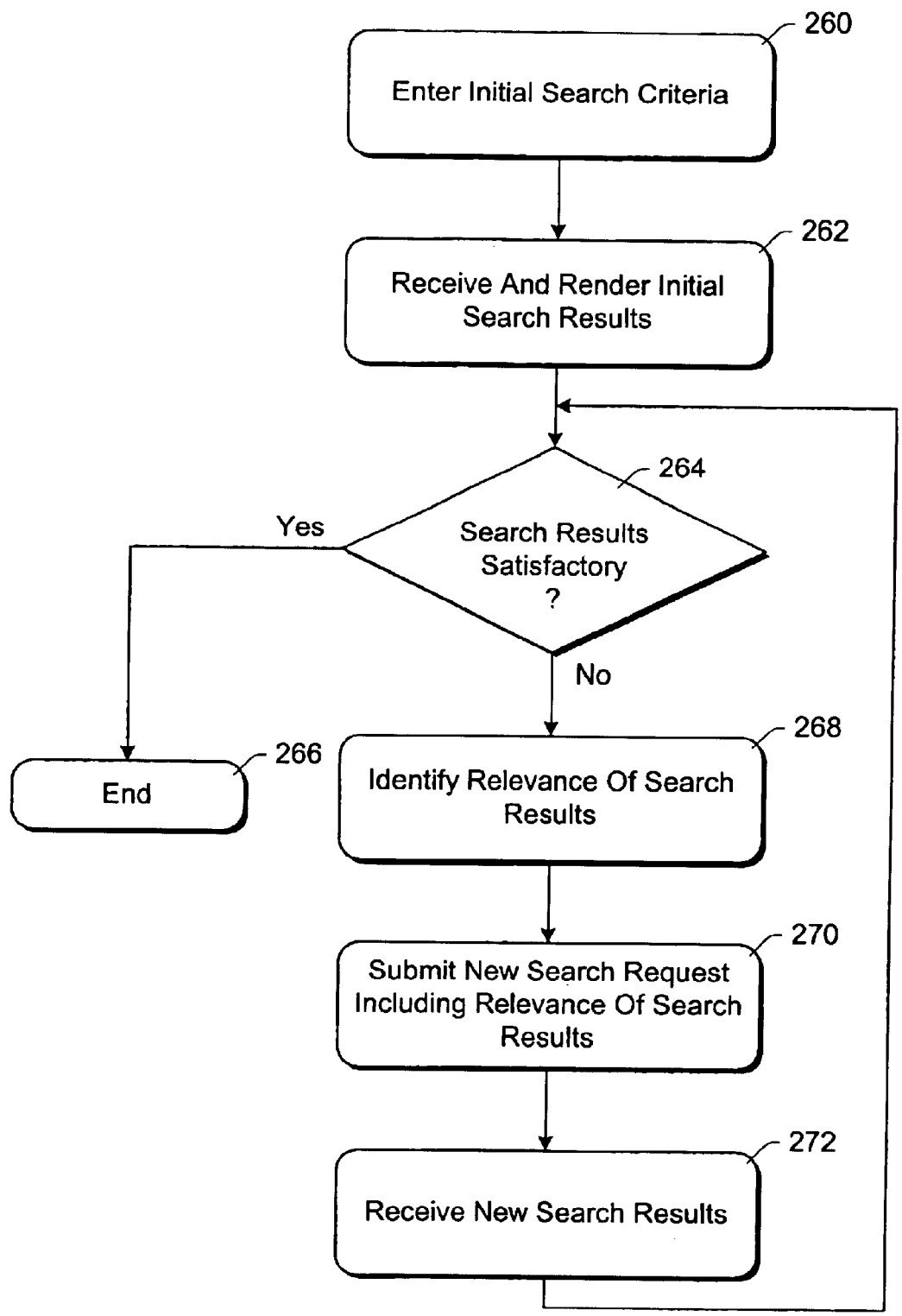
FIG. 4 is a flowchart illustrating an exemplary process, from the perspective of a client, for using relevance feedback to retrieve images.

FIG. 4 is a flowchart illustrating an exemplary process, from the perspective of a client, for using relevance feedback to retrieve images. The process of FIG. 4 is carried out by a client 108 of FIG. 1, and can be implemented in software. FIG. 4 is discussed with reference to components in FIGS. 1 and 3.

First, initial search criteria (e.g., an image) is entered by the user (act 260). The initial search criteria is used by image server 102 to identify potentially relevant images 238 which are received (from server 102) and rendered at client 108 (act 262) as the initial search results. The client then receives an indication from the user as to whether the search results are satisfactory. This indication can be direct (e.g., selection of an on-screen button indicating that the results are satisfactory or to stop the retrieval process) or indirect (e.g., input of relevance feedback indicating that one or more of the images is not relevant). If the search results are satisfactory, then the process ends (act 266).

However, if the search results are not satisfactory, then the relevance of the search results is identified (act 268). The relevance of one or more images in the search results is identified by user feedback (e.g., user selection of one of multiple options indicating how relevant the image is). A new search request that includes the relevance feedback regarding the search results is then submitted to server 102 (act 270). In response to the search request, the server 102 generates new search results (based in part on the relevance feedback), which are received by client 108 (act 272). The process then returns to act 264, allowing for additional user relevance feedback as needed.

Figure 5:
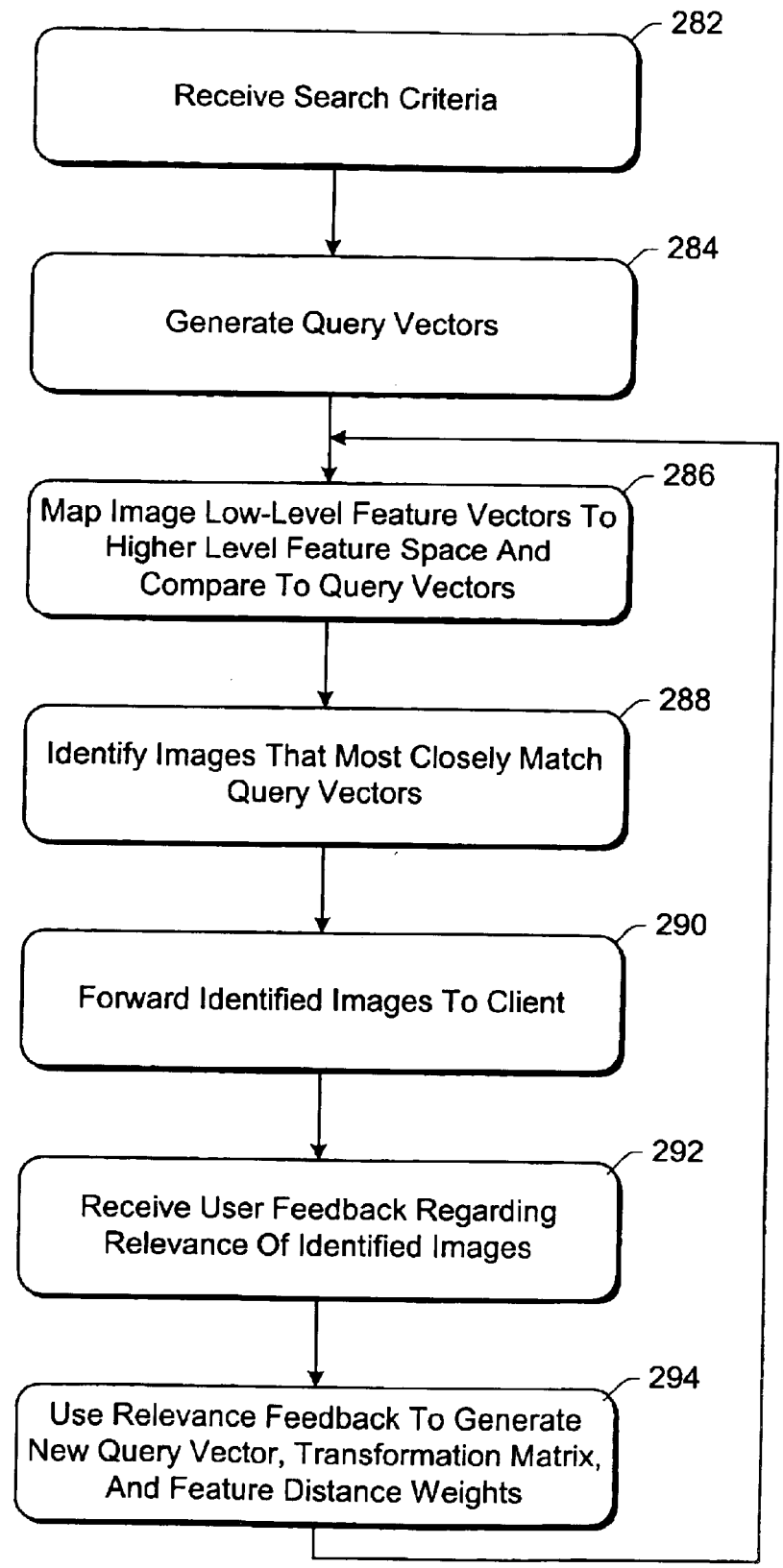
FIG. 5 is a flowchart illustrating an exemplary process, from the perspective of an image server, for using relevance feedback to retrieve images.

FIG. 5 is a flowchart illustrating an exemplary process, from the perspective of an image server, for using relevance feedback to retrieve images. The process of FIG. 5 is carried out by an image server 102 of FIG. 1, and can be implemented in software. FIG. 5 is discussed with reference to components in FIGS. 1 and 3.

To begin the image retrieval process, search criteria are received by image server 102 (act 282) as initial selection 232, in response to which generator 222 generates multiple query vectors (act 284). Comparator 224 then maps the low-level feature vectors of images in image collection 104 to a higher level feature vector for each image and compares the higher level feature vectors to the query vector (act 286). The images that most closely match the query vectors (based on the comparison in act 286) are then identified (act 288), and forwarded to the requesting client 108 (act 290). Alternatively, in some situations the mapping to the higher level feature space may not occur, and the comparison and identification may be performed based on the low-level feature space.

Server 102 then receives user feedback from the requesting client 108 regarding the relevance of one or more of the identified images (act 292). Upon receipt of this relevance feedback, generator 222 generates a new query vector based in part on the relevance feedback and comparator 224 uses the relevance feedback to generate a new transformation matrix and new feature distance weights (act 294). The process then returns to act 286, where the new mapping parameters and new query vector are used to identify new images for forwarding to the client.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. One or more computer readable media having stored thereon a plurality of instructions that, when executed by one or more processors, causes the one or more processors to perform acts including:
   receiving an initial image selection;
   generating a plurality of query vectors by extracting, for each query vector, one of a plurality of low-level features from the initial image selection;
   selecting a set of potentially relevant images based at least in part on distances between the plurality of query vectors and a plurality of feature vectors corresponding to low-level features of a plurality of images;
   receiving feedback regarding the relevance of one or more images of the set of potentially relevant images;
   generating a new plurality of query vectors based at least in part on the feedback;
   generating a weighting of feature elements based at least in part on the feedback; and selecting a new set of potentially relevant images based at least in part on both the weighting of feature elements and distances between the new plurality of query vectors and the plurality of feature vectors, wherein the selecting a new set of potentially relevant images comprises using a matrix in determining the distance between one of the new plurality of query vectors and one of the plurality of feature vectors, and further comprising dynamically selecting the matrix based on both a number of images in the set of potentially relevant images for which relevance feedback was input and a number of feature elements in the one feature vector, wherein the dynamically selecting further comprises:

if the number of images in the set of potentially relevant images for which relevance feedback was input is not less than the number of feature elements in the one feature vector, then using one matrix that transforms the query vector and the one feature vector to a higher-level feature space and then using another matrix that assigns a weight to each element of the transformed query vector and the transformed feature vector, and if the number of images in the set of potentially relevant images is less than the number of feature elements in the one feature vector, then using a matrix that assigns a weight to each element of the query vector and the one feature vector.

2. One or more computer readable media as recited in claim 1, wherein the dynamically selecting comprises using a diagonal matrix if the number of images in the set of potentially relevant images for which relevance feedback was input is less than the number of feature elements in the one feature vector, and otherwise using a full matrix.

3. One or more computer readable media as recited in claim 1, wherein X represents an image matrix that is generated by stacking N feature vectors, each of length K, corresponding to the set of potentially relevant images for which relevance feedback was received and resulting in an (N×K) matrix, C represents a weighted covariance matrix of X, det(C) represents the matrix determinant of C, and the matrix comprises a full matrix (W*) that is generated as follows:

$$W^* = (\det(C))^{\frac{1}{K}} C^{-1}.$$

4. One or more computer readable media as recited in claim 1, wherein $w_{kk}$ represents the $kk^{th}$ element of matrix W, $x_k$ represents the $k^{th}$ feature element, $\sigma_k$, represents the standard deviation of the sequence of $x_k$'s, the matrix comprises a diagonal matrix with each diagonal element ($w_{kk}$) being generated as follows:

$$w_{kk} = \frac{1}{\sigma_k}.$$

5. One or more computer readable media having stored thereon a plurality of instructions that, when executed by one or mire processors, causes the one or more processors to perform acts including:

receiving an initial image selection;

generating a plurality of query vectors by extracting, for each query vector, one of a plurality of low-level features from the initial image selection;

selecting a set of potentially relevant images based at least in part on distances between the plurality of query vectors and a plurality of feature vectors corresponding to low-level features of a plurality of images;

receiving feedback regarding the relevance of one or more images of the set of potentially relevant images;

generating a new plurality of query vectors based at least in part on the feedback wherein N represents the number of images in the set of potentially relevant images for which relevance feedback has been received, or, represents the relevance of image n in the set of images, $\vec{\pi}^T$ represents a transposition of a vector generated by concatenating the individual $\pi_n$ values, and X represents an image matrix that is generated by stacking N training vectors corresponding to the set of potentially relevant images into a matrix, and wherein each new query vector ($\vec{q}$) of the new plurality of query vectors is generated as follows:

$$\vec{q} = \frac{\vec{\pi}^T X}{\sum_{n=1}^{N} \pi_n};$$

generating a weighting of feature elements based at least in part on the feedback; and selecting a new set of potentially relevant images based at least in part on both the weighting of feature elements and distances between the new plurality of query vectors and the plurality of feature vectors.

6. One or more computer readable media having stored thereon a plurality of instructions that, when executed by one or more processors, causes the one or more processors to perform acts including:

receiving an initial image selection;

generating a plurality of query vectors by extracting, for each query vector, one of a plurality of low-level features from the initial image selection;

selecting a set of potentially relevant images based at least in part on distances between the plurality of query vectors and a plurality of feature vectors corresponding to low-level features of a plurality of images;

receiving feedback regarding the relevance of one or more images of the set of potentially relevant images;

generating a new plurality of query vectors based at least in part on the feedback;

generating a weighting of feature elements based at least in part on the feedback; and selecting a new set of potentially relevant images based at least in part on both the weighting of feature elements and distances between the new plurality of query vectors and the plurality of feature vectors, wherein $f_i$ represents a summation, over the images in the set of potentially relevant images, of a product of a relevance of the image and a distance between the query vector and the feature vector, and wherein the selecting a new set of potentially relevant images comprises combining, for each image, a weighted distance between the plurality of query vectors and the plurality of feature vectors, and wherein the weight ($u_i$) for each of a plurality (I) of distances between a query vector and a corresponding feature vector is calculated as:

$$u_i = \sum_{j=1}^{I} \sqrt{\frac{f_j}{f_i}}.$$

7. A method comprising:
generating a query vector corresponding to a feature of one image;
identifying a feature vector corresponding to the feature of another image;
identifying a number of training samples for which relevance feedback has been received;
if the number of training samples either equals or exceeds a threshold amount, then determining a distance between the query vector and the feature vector including transforming the query vector and the feature vector to a higher-level feature space and then assigning a weight to each element of the transformed query vector and the transformed feature vector; and
if the number of training samples does not exceed the threshold amount, then determining the distance between the query vector and the feature vector including assigning a weight to each element of the query vector and the feature vector.

8. A method as recited in claim 7, wherein the feature vector includes a plurality of feature elements and wherein the threshold amount comprises the number of feature elements in the feature vector.

9. A method as recited in claim 7, wherein if the number of training samples either equals or exceeds the threshold amount, then determining the distance (g), where P is a mapping matrix, $\vec{q}$ is the query vector, $\vec{x}$ is the feature vector, and $\Lambda$ is a weighting matrix, as:

$$g=(P(\vec{q}-\vec{x}))^T \Lambda (P(\vec{q}-\vec{x})).$$

10. A method as recited in claim 7, wherein if the number of training samples does not exceed the threshold amount, then determining the distance (g), where $\vec{q}$ is the query vector, $\vec{x}$ is the feature vector, and $\Lambda$ is a weighting matrix, as:

$$g=(\vec{q}-\vec{x})^T \Lambda (\vec{q}-\vec{x}).$$

11. A method as recited in claim 7, further comprising:
repeating the generating, identifying of the feature vector, identifying of the number of training samples, and the determining for each of a plurality of features; and
identifying how closely the image and the another image match each other by combining the distances between the query vectors and the feature vectors for the plurality of features.

12. A method as recited in claim 11, wherein the identifying how closely the image and the another image match each other comprises calculating a weighted summation of each of the individual distances for each of the plurality of features.

13. One or more computer readable media including a computer program that is executable by a processor to perform the method recited in claim 7.

14. A system comprising:
a query vector generator to generate a query vector corresponding to a feature of one image;
a comparator, coupled to the query vector generator, to,
identify a feature vector corresponding to the feature of another image,
identify a number of training samples for which relevance feedback has been received,
if the number of training samples either equals or exceeds a threshold amount, then to determine a distance between the query vector and the feature vector including transforming the query vector and the feature vector to a higher-level feature space and then assigning a weight to each element of the transformed query vector and the transformed feature vector, and
if the number of training samples does not exceed the threshold amount, then to determine the distance between the query vector and the feature vector including assigning a weight to each element of the query vector and the feature vector.

15. A method comprising:
for one of a plurality of images and each of a plurality of features,
generating, based on a set of search criteria, a query vector for the feature,
identifying a feature vector, corresponding to the image, for the feature, wherein identifying the feature vector includes:
identifying a low-level feature vector corresponding to the feature; and
mapping the low-level feature vector to a higher level feature space;
determining how closely the feature vector matches the query vector; and
determining how closely the image matches the set of search criteria based on how closely, for the plurality of features, the feature vectors match the query vectors, wherein generating the query vector comprises generating the query vector based at least in part on user relevance feedback regarding how relevant images previously displayed to a user were.

16. A method as recited in claim 15, wherein the identifying the feature vector further comprises incorporating, into the mapping, relevance feedback.

17. A method of generating a query vector to compare to a feature vector of another image, the method comprising:
receiving feedback regarding the relevance of each image of a set of images;
wherein N represents the number of images in the set of images for which user relevance feedback has been received, $\zeta_n$ represents the relevance of image n in the set of images, $\vec{\pi}^T$ represents a transposition of a vector generated by concatenating the individual $\pi_n$ values, and X represents an image matrix that is generated by stacking N training vectors corresponding to the set of images into a matrix; and
generating a query vector ($\vec{q}$) corresponding to one of a plurality of features as follows:

$$\vec{q} = \frac{\vec{\pi}^T X}{\sum_{n=1}^{N} \pi_n}.$$

18. One or more computer readable media including a computer program that is executable by a processor to perform the method recited in claim 17.

19. A method of generating a weight to apply to distances between query vectors and feature vectors when combining the distances, the method comprising:
receiving feedback regarding the relevance of each image of a set of images;
wherein $f_i$ represents a summation, over the images in the set of images, of a product of a relevance of the image and a distance between the query vector and the feature vector; and generating a weight ($u_i$) for each of a plurality (I) of distances between a query vector corresponding to one of a plurality (I) of features and a feature vector corresponding to the one of the plurality (I) of features as:

$$u_i = \sum_{j=1}^{I} \sqrt{\frac{f_j}{f_i}}.$$

20. One or more computer readable media including a computer program that is executable by a processor to perform the method recited in claim 19.

21. One or more computer readable media including a computer program that is executable by a processor to cause the processor to perform acts of:

receiving user feedback regarding the relevance of each image of a set of images, the user feedback forming a range including at least Highly Relevant, Relevant, No Opinion, Irrelevant, and Highly Irrelevant;

wherein N represents the number of images in the set of images for which user feedback has been received, $\pi_n$ represents the relevance of image n in the set of images, $\vec{\pi}^T$ represents a transposition of a vector generated by concatenating the individual $\pi_n$ values, and X represents an image matrix that is generated by stacking N training vectors corresponding to the set of images into a matrix; and generating a query vector ($\vec{q}$) corresponding to one of a plurality of features as follows:

$$\vec{q} = \frac{\vec{\pi}^T X}{\sum_{n=1}^{N} \pi_n}.$$

22. One or more computer readable media as recited in claim 21, wherein the receiving user feedback comprises receiving user feedback via speech recognition.

23. One or more computer readable media having stored thereon a plurality of instructions that, when executed by one or more processors, causes the one or more processors to:

select a set of potentially relevant images based at least in part on distances between a plurality of query vectors extracted from an initial image selection and a plurality of feature vectors corresponding to low-level features of a plurality of images;

receive feedback regarding the relevance of one or more images of the set of potentially relevant images;

generate a new plurality of query vectors based at least in part on the feedback;

generate a weighting of feature elements based at least in part on the feedback; and select a new set of potentially relevant images based at least in part on both the weighting of feature elements and distances between the new plurality of query vectors and the plurality of feature vectors, wherein fi represents a summation, over the images in the set of potentially relevant images, of a product of a relevance of the image and a distance between the query vector and the feature vector, and wherein the selecting a new set of potentially relevant images comprises combining, for each image, a weighted distance between the plurality of query vectors and the plurality of feature vectors, and wherein the weight ($u_i$) for each of a plurality (I) of distances between a query vector and a corresponding feature vector is calculated as:

$$u_i = \sum_{j=1}^{I} \sqrt{\frac{f_j}{f_i}}.$$

24. One or more computer readable media as recited in claim 23, wherein the plurality of instructions to cause the one or more processors to select comprises instructions to cause the one or more processors to use a matrix in determining the distance between one of the new plurality of query vectors and one of the plurality of feature vectors, and further comprises instructions to cause the one or more processors to dynamically select the matrix based on both a number of images in the set of potentially relevant images for which relevance feedback was input and a number of feature elements in the one feature vector, wherein the instructions to dynamically select comprise instructions to cause the one or more processors to use a diagonal matrix when the number of images in the set of potentially relevant images for which relevance feedback was input is less than a number of feature elements in the one feature vector, and otherwise using a fill matrix.

25. One or more computer readable media as recited in claim 23, wherein the plurality of instructions to cause the one or more processors to select comprises instructions to cause the one or more processors to:

use one matrix that transforms the query vector and the one feature vector to a higher-level feature space and then using another matrix that assigns a weight to each element of the transformed query vector and the transformed feature vector when the number of images in the set of potentially relevant images for which relevance feedback was input is not less than the number of feature elements in the one feature vector; and use a matrix that assigns a weight to each element of the query vector and the one feature vector when the number of images in the set of potentially relevant images is less than the number of feature elements in the one feature vector.

* * * * *